Oct. 22, 1929.   C. O. STOHLGREN   1,732,953
SAW FOR BUTTON MAKING MACHINES
Filed June 21, 1926
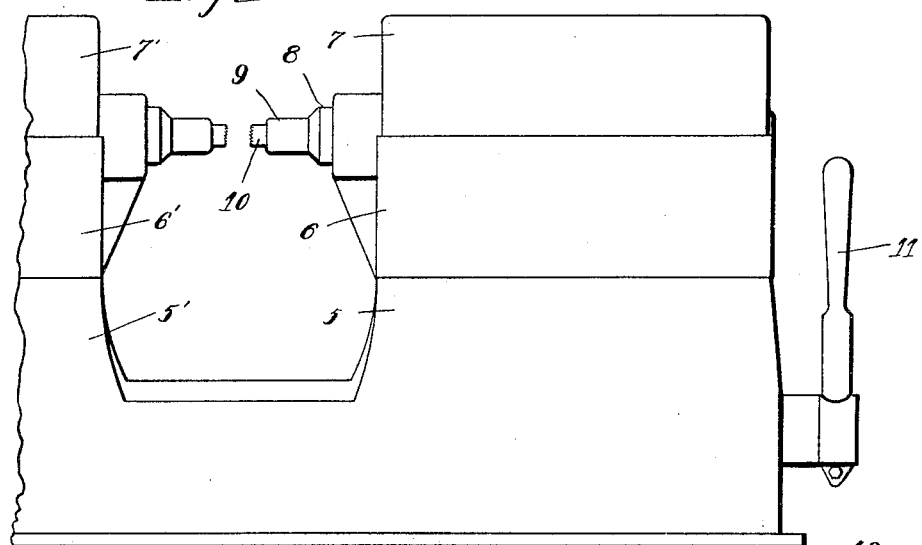
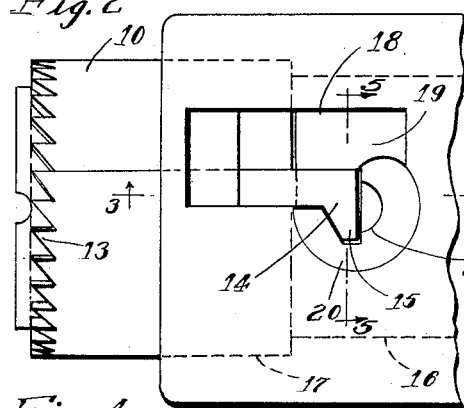
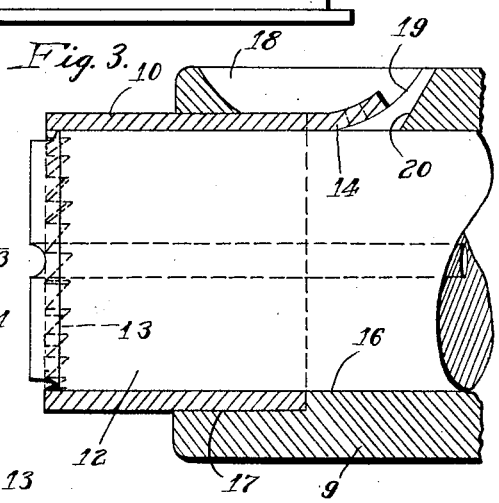
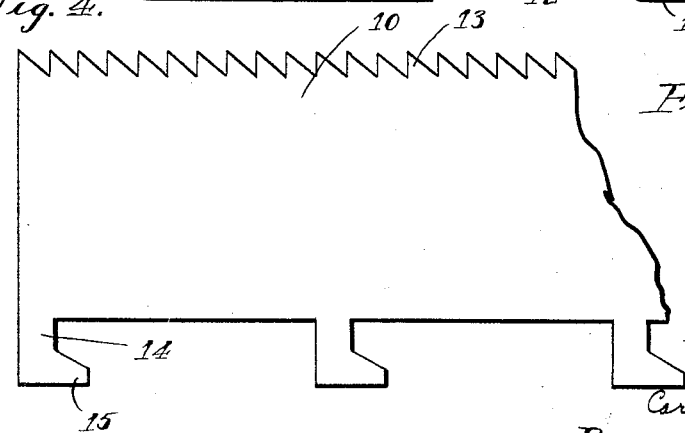
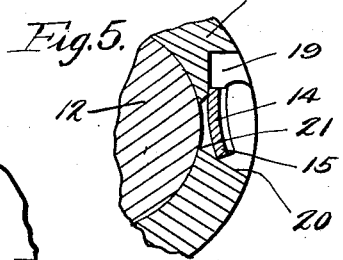
Inventor:
Carl O. Stohlgren
By Wilson & McCanna
Attys.

Patented Oct. 22, 1929

1,732,953

UNITED STATES PATENT OFFICE

CARL O. STOHLGREN, OF ROCKTON, ILLINOIS

SAW FOR BUTTON-MAKING MACHINES

Application filed June 21, 1926. Serial No. 117,358.

This invention relates to the art of button making and is particularly concerned with the provision of a novel saw for use in button making machines in the cutting of button blanks from mussel shells and the like.

The principal object of the invention is to provide a cheaper and more durable saw blade for the purpose referred to than has heretofore been available. Tubular saw blades as provided in the past have been costly first of all because of the difficult and tedious operations involved in producing the same due to their form, and furthermore due to the fact that they required frequent replacement in the course of a day's operation. The necessity for frequent replacement of blades reduced the operating efficiency as it meant the shutting down of the machine a considerable period in the aggregate in a day's operation, thus lessening the production of the machine and wasting the operator's time. The present invention provides a saw blade capable of production at as low cost as hack saw blades and the like are now produced and affords also the greater durability which such blades offer.

The saw blade, as will hereinafter appear, is produced in the form of flat blanks of sheet metal with the teeth provided by a punching operation and subsequently ground to the desired uniformity and sharpness, while a plurality of lugs are provided on the other side of the blank, suitably in the same punching operation, arranged when the blank is bent into a tubular form with the ends substantially in flush abutting relation to serve in the capacity of a holding or clinching means when the blade is installed in the machine. In the application of the blade on the chuck end of the arbor and in connecting the same with the saw spindle the latter is suitably provided with recesses for clinching the lugs of the blade to hold the same rigidly and transmit the drive thereto.

The invention is illustrated in the accompanying drawing wherein—

Figure 1 is a front view, partly broken away, of a button making machine of the type to which the blade of the present invention may be applied;

Fig. 2 is an enlarged view of one of the blades shown mounted on the chuck end of the arbor of the machine and clinched into positive connection with the sleeve portion of the saw spindle, only the outer end of which is shown;

Fig. 3 is a longitudinal section taken on the line 3—3 of Fig. 2 looking in the direction of the arrows;

Fig. 4 is a developed view of a blade previous to the bending of the same into tubular form in the final forming operation previous to the hardening and tempering of the blade, and Fig. 5 is a fragmentary sectional view taken on the line 5—5 of Fig. 2 looking in the direction indicated by the arrows.

The machine illustrated is of the type shown in my Patent 1,641,462, issued September 6, 1927, consisting of a pair of hollow base frames 5 and 5' carried on a suitable support and surmounted by hollow top frames 6 and 6' having caps or cover plates 7 and 7'. The hollow structures thus formed constitute supports and housings for the principal operating parts of two opposed sets of shell-clamping and cutting mechanisms. Each of the mechanisms comprises a saw spindle 8 the sleeve portion 9 of which provides a holder for a tubular button cutting saw blade 10. Suitable means are provided within the housing structures for driving the saw spindles and the blades carried thereby while the spindle and the blade carried thereby are arranged to be given endwise movement by the operation of a handle 11 provided at one end of the machine. The blades 10, as stated before, were provided heretofore of a plain, tubular form and suitably held by frictional engagement in a chuck provided on the end of the saw spindle about the end of the arbor 12. These blades were quite expensive to produce as they involved considerable hand work and were objectionable since they required replacement several times in the course of a day's operation thus necessitating the shutting down of the machine and the consequent loss in production and wasting of the operator's time.

According to the present invention, the saw blades 10 are produced from a blank, as shown in Fig. 4, resembling a hack saw blade. The operations in producing the teeth 13 are practically the same as those required in the making of the hack saw blades, that is, the mere punching and grinding operations. The blade also has a plurality of lugs 14 provided in regularly spaced relation along the other side of the blank opposite the teeth 13 by stamping out the intervening metal from the blank. These lugs, as will presently appear, serve to clinch the blade in position in its holder on the spindle and afford a positive driving connection between the blade and the spindle. The outer ends of the lugs 14 are offset laterally as indicated at 15, to provide spurs or teeth which aid in the clinching of the blade, as will also be made clear hereinafter, it being sufficient to note here that the teeth 15 extend rearwardly as respects the cutting face of the teeth 13. The object of this is to make the driving thrust effective in furthering the tightening of the blade in its holder. The blade blank, after it is formed up to the configuration shown in Fig. 4, is bent into tubular form with the ends disposed in substantially flush abutting relation, as appears in Fig. 2. The usual hardening and tempering operations will then be performed as are generally resorted to in the case of hack saw blades to make the blade durable and enable it to withstand the stresses imposed in operation.

The blade when completed has the teeth 13 all disposed in a common plane and, of course, directed the same way, while the lugs 14 project beyond the plane of the other end of the blade with the teeth 15 directed in an opposite direction from the teeth 13, as clearly appears in Fig. 2. The sleeve 9 of the spindle 8 has the bore 16 thereof enlarged at the outer end thereof, as at 17, to provide an annular socket or recess for the reception of the blade. Intersecting the enlarged portion 17 of the bore 16 is a cut out portion 18, the base of which is arcuate, as shown at 19, the cut being made by a milling operation with a tool having a narrow cutting edge. The base 19 of the cut out portion 18 is approximately tangent to the bore 16 at the inner end of the enlargement 17 of the bore. As a result of this, when the blade is inserted the lug 14 is caused to ride up on the arcuate surface 19, as indicated in Fig. 3, the lug being bent, while the rest of the blade is firmly sustained in position by reason of its embracing the arbor 12 and resting in engagement with the enlarged portion 17 of the bore 16. Three cut out portions 18 are provided, one for each of the lugs 14. The curling up of the lug 14 in the manner referred to is partly responsible for the positive way in which the blade is held and driven by the saw spindle. The clinching is further by the engagement of the end of the spur or tooth 15 on each of the lugs 14 on an inclined surface 20 suitably provided by drilling a tapered hole 21 through the wall of the sleeve portion 9 of the saw spindle at the inner end of the cut out portion 18, thus affording a recess for the engagement therein of the tooth 15 to lock the blade securely in place. When the end of the tooth 15 rides up on the inclined surface 20 provided by the side of the tapered opening 21 it is curled up transversely to the way in which the lug 14 is curled by riding up on the surface 19. This positively clinches the lug and a very effective driving connection is afforded between the blade and the spindle. Furthermore, it is obvious that the greater the resistance imposed to the turning of the blade the more effective the clinching becomes. In the removing of the blade, it is an easy matter to insert the end of a screw driver or other tool in the opening 21 to dislodge the lug 14 from its tight hold and to turn the blade about to a position where the lug 14 can be withdrawn to withdraw the blade.

It is believed that the foregoing conveys a clear understanding of the objects prefaced above and while I have illustrated but a single embodiment it should be understood that changes might be made in details of construction without departing from the spirit and scope of the invention as expressed in the appended claims, in which—

I claim:

1. The combination in a chuck for a button making machine of a tubular button cutting saw blade having a toothed end and having lugs projecting from the plane of the other end thereof, and means in said chuck for subjecting each lug to deflection in transverse directions whereby to secure the blade in place.

2. The combination in a chuck for a button making machine of a tubular button cutting saw blade having a toothed end and having resilient lugs projecting from the plane of the other end thereof, the lugs having projections on the free ends thereof, means in said chuck arranged to engage the lugs to deflect the same for the purpose of fastening the blade, the said lugs when released from the deflecting stress being adapted to spring back to normal position to permit removal of the blade, and means in said chuck cooperating with the projections on the free ends of said lugs to retain the blade with the lugs in deflected position.

3. In a button making machine, the combination of an arbor having a cylindrical chuck end portion, a saw spindle having a sleeve portion extending about said chuck end, said sleeve portion having the bore thereof enlarged at the outer end thereof to provide an annular recess, a tubular saw blade fitting over the chuck end within said recess, said blade having lugs projecting from the plane of the inner end thereof, and said spindle sleeve portion having arcuate cut out portions through the wall thereof at the inner end of the enlargement of the bore thereof to provide inclined surfaces for engagement by said lugs whereby to hold and drive the saw blade with said spindle.

4. In a button making machine as set forth in claim 3, the provision of offset portions on the outer ends of said lugs on said saw blade, and sockets provided in the sleeve portion of said spindle at one side of said cut out portions to receive said offset portions to lock the saw blade in the sleeve portion of said spindle.

5. In a button making machine as set forth in claim 3, the provision of offset portions on the outer ends of said lugs on said saw blade, and sockets provided in the sleeve portion of said spindle at one side of said cut out portions to receive said offset portions whereby to lock the saw blade in the sleeve portion of said spindle, said sockets being in the form of tapered holes drilled through the wall of said spindle sleeve portion whereby to provide inclined walls for engagement by the offset portions of said lugs.

6. The combination in a chuck for a button making machine of a tubular button cutting saw blade having a toothed end and having resilient lugs projecting from the plane of the other end thereof, the free ends of said lugs having lateral projections, means in said chuck for subjecting the lugs to deflection out of their normal plane in transverse directions for the purpose of fastening the blade in position, the said lugs when released from the deflecting stress being adapted to spring back to normal position to permit removal of said blade, and means in said chuck cooperating with the lateral projections on the free ends of said lugs to retain the blade with the lugs in deflected position.

7. The combination in a chuck for a button making machine of a tubular button cutting saw blade having a toothed end and having resilient lugs projecting from the plane of the other end thereof, the free ends of said lugs having lateral projections, means in said chuck for subjecting the lugs to deflection in a plane transverse with respect to the normal plane of the lugs for the purpose of fastening the blade in position, the said lugs when released from the deflecting stress being adapted to spring back to normal position to permit removal of said blade, and means in said chuck cooperating with the lateral projections on the free ends of said lugs to retain the blade with the lugs in deflected position.

8. The combination in a chuck for a button making machine of a tubular button cutting saw blade having a toothed end, and having lugs projecting from the plane of the other end thereof, each of said lugs having a laterally projecting offset end, and means in said chuck for engagement with the offset ends of said lugs to deflect the same in a transverse plane and thereby secure the blade in place.

9. In a button making machine, the combination of an arbor having a cylindrical chuck end portion, a saw spindle having a sleeve portion extending about said chuck end, said sleeve portion having the bore thereof enlarged at the outer end thereof to provide an annular recess, a tubular saw blade fitting over the chuck end within said recess, said blade having lugs projecting from the plane of the inner end thereof provided with laterally projecting offset free ends, and said spindle sleeve portion having recesses communicating with the inner end of the annular recess adapted to receive said lugs, the said recesses having the inner ends thereof offset for locking engagement therein of the offset free ends of said lugs, whereby to hold and drive the saw blade with the spindle.

10. A button making machine as set forth in claim 9 wherein the offset inner ends of said recesses provide inclined surfaces for engagement by the offset end portions of said lugs for the purpose described.

In witness of the foregoing I affix my signature.

CARL O. STOHLGREN.